Figure 1:
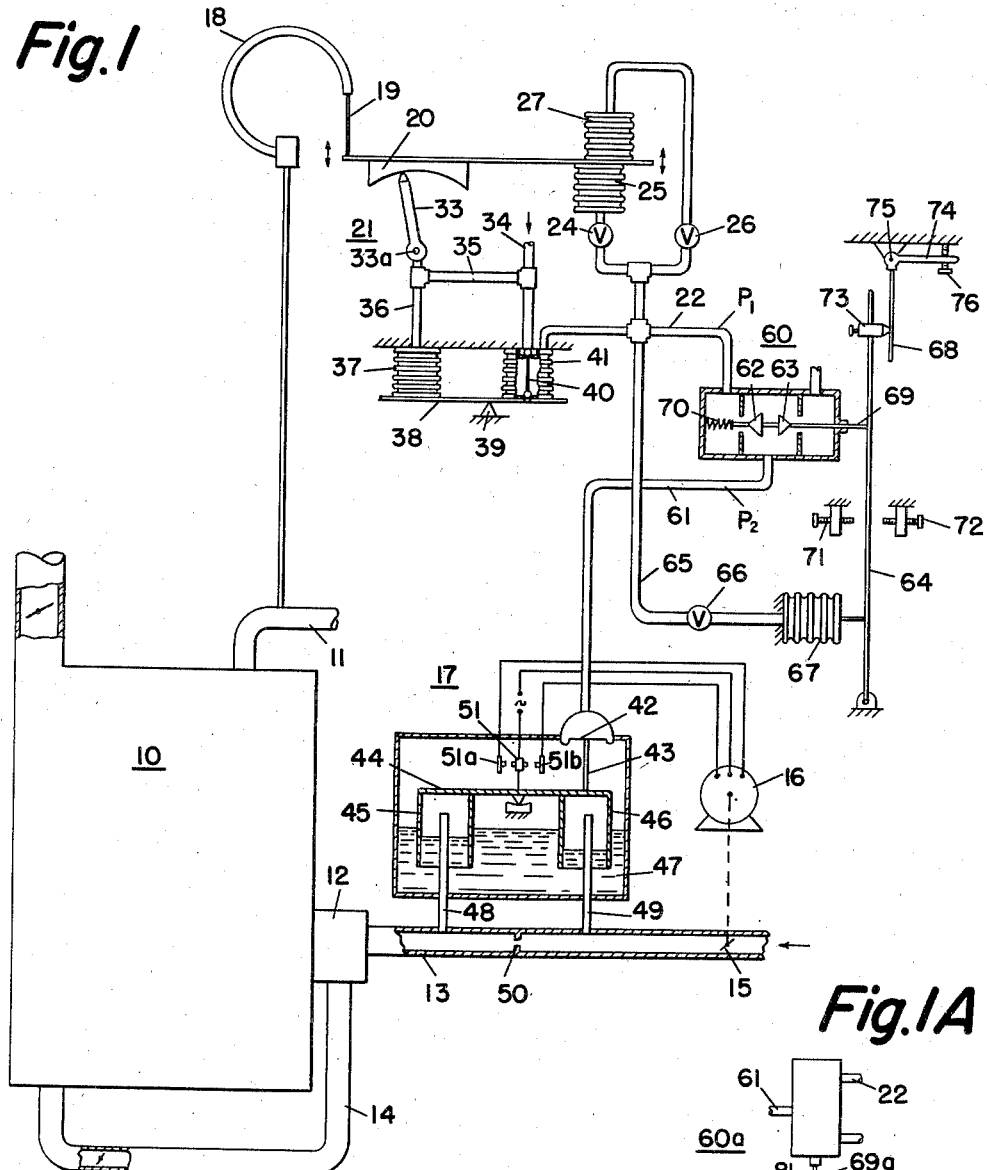
Figure 1A:
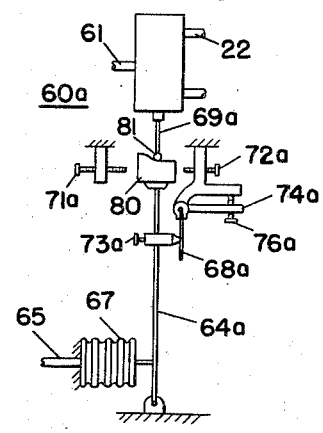

Feb. 18, 1958     E. S. BRISTOL     2,823,860
APPARATUS FOR MODIFYING A CONTROL OR MEASURING SIGNAL
Filed March 2, 1953                                3 Sheets-Sheet 1

Feb. 18, 1958  E. S. BRISTOL  2,823,860
APPARATUS FOR MODIFYING A CONTROL OR MEASURING SIGNAL
Filed March 2, 1953  3 Sheets-Sheet 2
*Fig. 2*
*Fig. 2A*
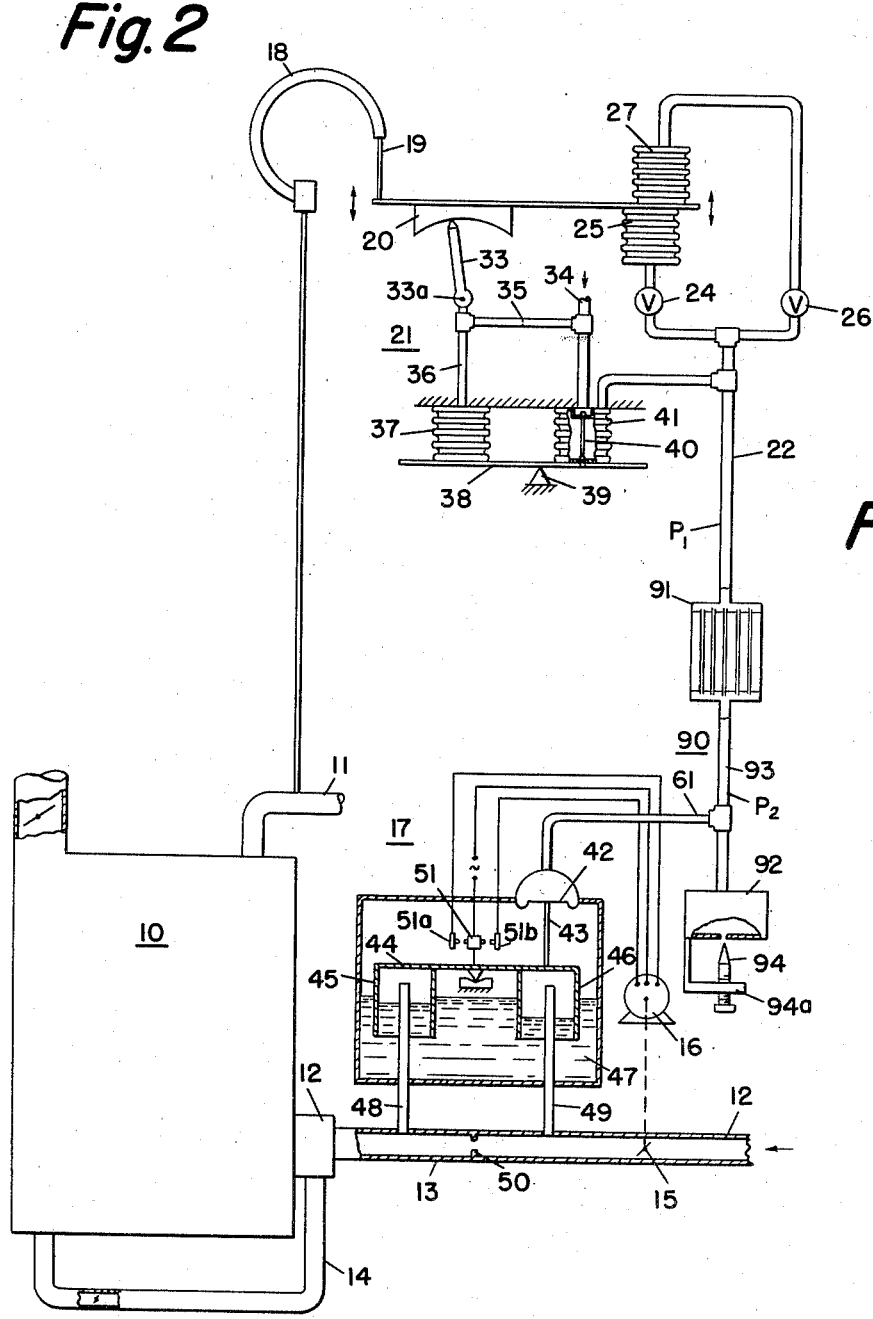
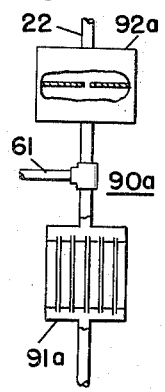

Feb. 18, 1958     E. S. BRISTOL     2,823,860
APPARATUS FOR MODIFYING A CONTROL OR MEASURING SIGNAL
Filed March 2, 1953     3 Sheets-Sheet 3
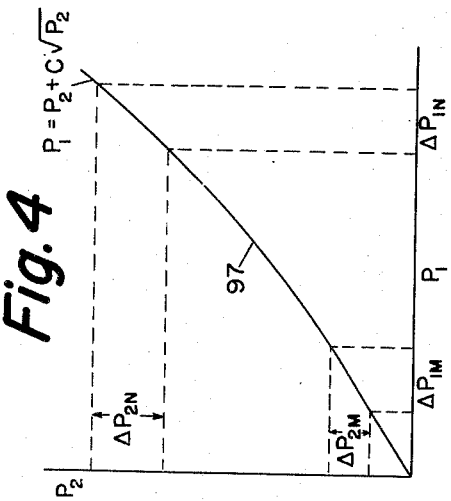
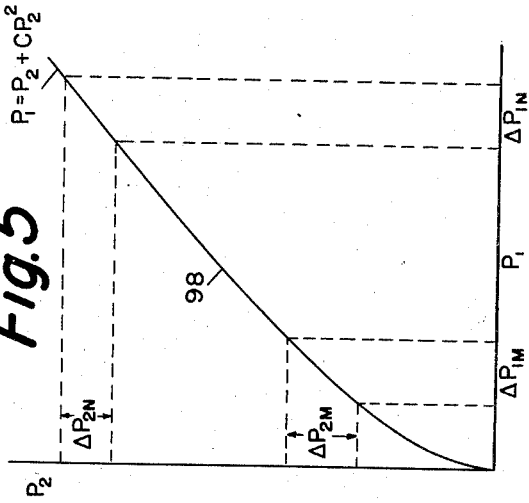
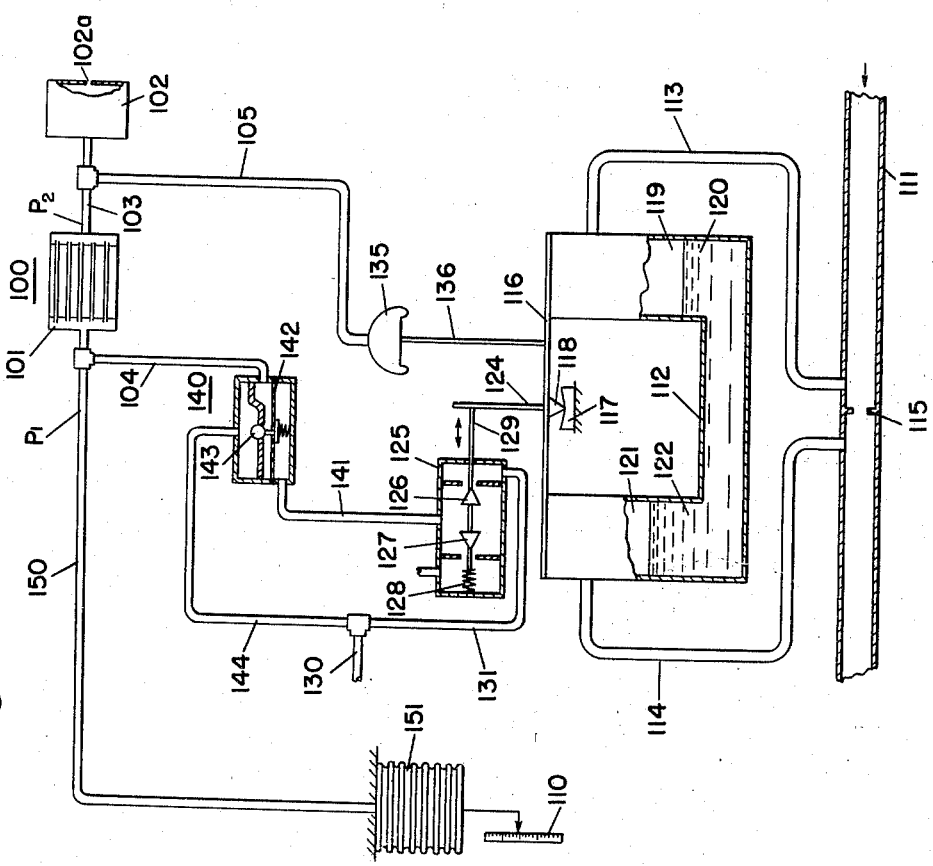

United States Patent Office 2,823,860
Patented Feb. 18, 1958

2,823,860

APPARATUS FOR MODIFYING A CONTROL OR MEASURING SIGNAL

Edward S. Bristol, Philadelphia, Pa., assignor to Leeds and Northrup Company, Philadelphia, Pa., a corporation of Pennsylvania Application March 2, 1953, Serial No. 339,880

9 Claims. (Cl. 236—26)

This invention relates to automatic control systems for maintaining the magnitude of a condition at a predetermined value and has for an object the provision of means, in a control system producing a control signal for regulating the magnitude of a condition, for modifying the control signal with change in its magnitude to change the ratio between the magnitude of the control signal and the magnitude of the condition.

In many systems where it is desired to maintain the magnitude of a condition at a selected or predetermined value, within limits, such as pressure, temperature or rate of flow, devices are used which are responsive to the change in the condition to be regulated, the latter frequently being referred to as the controlled variable. The response of these devices may vary with the square of the manipulated variable, the latter being that quantity which affects the magnitude of the controlled variable. Accordingly, when the system includes a measuring device which responds non-linearly to the manipulated variable and a sensitive device which produces a control signal which varies linearly with the controlled variable, the action of the control system as a whole will differ as the magnitude of the control signal necessary to maintain the variable at its predetermined value varies throughout its normal operating range.

In carrying out the invention in one form thereof there is provided in the system a means for modifying the control signal, which means is operable with change in magnitude of the control signal to vary in selected manner the ratio between the change in magnitude of the control signal and the change in magnitude of the condition. Thus the change in the foregoing ratio may occur as a result of variations in load upon the controlled system even though the magnitude of the condition remains constant at the selected value. In one example of the invention, a measuring device responsive to the flow of gas has a response characteristic which varies with the square of the flow of the gas. When used with a balanceable control system employing a primary element which produces an output varying linearly with the controlled variable, there is introduced between the measuring device and the output-producing portion of the automatic control system a control signal modifier which automatically modifies the control signal with change of the controlled variable in accordance with a square law relationship and applies the modified control signal to the measuring device so that its response in terms of the control effects produced is linear Further in accordance with the invention, there may be provided a modifying device for utilization with measuring means having a non-linear response for providing an output varying linearly with the magnitude of the quantity being measured. Such an arrangement is applicable for permitting the summation of the outputs from a plurality of flow measuring devices or other devices having a non-linear response characteristic.

For further objects and advantages of the invention and for a more detailed description thereof, reference is to be had to the following description taken in conjunction with the accompanying drawings, in which:

Fig. 1 diagrammatically illustrates the invention as applied to the control of the pressure of a vapor generator;

Fig. 1-A is a fractional view showing a modified form of the invention;

Fig. 2 diagrammatically illustrates another modified form of the invention likewise applied to a vapor generator;

Fig. 2-A is a fractional view showing a further modification of the invention;

Fig. 3 illustrates diagrammatically the invention applied to a measuring system; and Figs. 4 and 5 are graphs which may be useful in explaining the invention.

Referring to the drawings, the controlled variable will be the vapor or steam pressure in outlet pipe 11 from a steam or vapor generator 10 having fuel supplied thereto as by a gas burner unit 12 supplied with gas through line 13 and with preheated air supplied by way of line 14 from a preheater (not shown).

As the pressure at outlet pipe 11 changes, a flow-controlling valve 15, shown in its simplest form as a butterfly damper in supply line 13, is adjusted as by a motor 16 to vary the fuel supply to the steam generator 10. The motor 16 is under the joint control of a flow-measuring device 17 and a pressure-responsive device shown as a Bourdon tube 18 which is connected through a link 19 to a baffle 20 of a regulator 21 which produces an output pressure in an output line 22 which varies linearly in magnitude with change in pressure as detected by the device 18. The regulator 21 preferably includes a pneumatic pilot and a pneumatic booster, both diagrammatically illustrated here, and may be of the type disclosed in McLeod Patent No. 2,507,606 and fully described therein. In brief, as the baffle 20 is moved toward or away from a rotatable nozzle 33, pressure introduced by way of a supply line 34 and an orifice 35 is varied in magnitude in line 36 depending upon the rate of flow through the nozzle 33. This rate of flow, in turn, depends upon the spacing between the end of that nozzle and the curved baffle 20 of the pilot device. Thus, the pressure in line 36 and as applied to a bellows 37 of the pneumatic booster varies with change in pressure in steam line 11. The bellows 37 rotates a lever 38 pivoted at 39 to change the position of a valve-controlling element 40. When the pressure in bellows 37 is increasing the lever 38 will be rotated in a counterclockwise direction and through valve element 40 will permit air to flow from supply line 34 into bellows 41 until the pressure therein bears a predetermined relation to that in bellows 37. This relationship will depend upon the relative lengths of the lever arms with respect to the pivot 39. Since the bellows 41 has the shorter lever arm, the pressure in bellows 41 will be higher than in bellows 37 with the lever 38 in the balance position with both valve elements closed. Thus, the pressure changes in output line 22 will vary with the pressure of the steam in line 11, but will be magnified with respect to the pressure changes, for example, in line 36.

As further disclosed in said McLeod patent, the output pressure in line 22 is applied by way of a valve 24 to a proportional bellows 25 of the pilot device which acts in a direction to oppose the change in the position of baffle 20 produced by the Bourdon tube 18. The negative feedback provided by bellows 25 produces a reduced movement of baffle 20 for a given change in steam pressure so that the pressures in line 36 and in output line 22 vary linearly with the pressure of the steam in line 11. The proportional band or extent of steam pressure change to effect full range of output pressure in line 22 may be varied by rotation of nozzle 33 about its pivot 33a. If the valve 24 be partly closed to provide flow restriction, then there is introduced into the output pressure in line 22 a component proportional to the rate of change of steam pressure. The pressure in output line 22 is also applied by way of a valve or flow restriction 26 to a reset bellows 27. As well understood by those skilled in the art, the provision of the reset bellows provides a component in the pressure of output line 22 which enables the system to maintain the controlled variable, as the pressure in line 11, at a predetermined value, notwithstanding change in load on the steam generator 10 from a very low value to a high value or any other disturbance requiring variation of output loading pressure in output line 22 to maintain constant steam pressure.

In the past, the output pressure $P_1$ from the regulator 21 was applied directly to utilization means such as a diaphragm 42 associated with the measuring device 17. The diaphragm 42 through a link 43 applies a force to a pivoted lever 44 forming a part of a flow metering element of conventional construction. The pressure bells 45 and 46 have their lower ends immersed in a liquid 47 so that the respective pipes 48 and 49 having their open ends near the top of each bell apply pressures thereto of magnitude which will differ with change in flow of gas through the pipe, the difference being in part due to the presence between them of a flow restriction 50. Thus, with a constant pressure applied to diaphragm 42, should there be a change in flow of gas through pipe 13, the pivoted lever 44 will respond to move a contact 51 relative to a pair of stationary contacts 51a, 51b to energize the motor 16 in a direction to return the rate of flow to its original value. By changing the pressure applied to diaphragm 42, the control contact 51 will likewise be moved in response to change in the magnitude of this pressure, and the net result will be movement of control contact 51 in response to the relative magnitudes of the forces developed upon the pivoted lever 44. This will result in change in fuel flow through pipe 13 corresponding to change in pressure applied to diaphragm 42.

In accordance with the present invention the output pressure $P_1$ from the regulator 21 as it appears in output line 22 is modified so that for a given change in the controlled variable, the pressure in steam line 11, resulting in a pressure change $\Delta P_1$ in line 22, there will be a different change $\Delta P_2$ in the pressure $P_2$ applied to diaphragm 42 when the pressure $P_1$ in output line 22 is at a low value than the change which would occur when the pressure $P_1$ in output line 22 is at a high value. As the change $\Delta P_1$ in pressure $P_1$ in output line 22 is, in the absence of reset and rate actions, linearly related to the change in pressure in steam line 11, the aforementioned modification results in a variable ratio $\Delta P_1/\Delta P_2$.

In the pressure-modifying device 60 of Fig. 1, the output pressure $P_2$ in line 61 which is applied directly to diaphragm 42 will not be linearly related to the pressure $P_1$ in output line 22 for the reason that there is provided between lines 22 and 61 a pressure-modifying device comprising a variable flow restriction 62 and a variable flow restriction 63 between line 22 and a constant reference pressure, in this case atmospheric pressure, the effectiveness of the two restrictions 62 and 63 in modifying the pressure being determined by the position of a pressure-responsive lever 64. Thus, it will be seen that through a line 65 the output pressure $P_1$ of line 22 is applied by way of a flow restriction 66 to a bellows 67 which applies a force on pivoted lever 64 against the bias of a flexible spring 68. The lever 64 bears against the positioning stem 69 of the flow restrictions 62 and 63. The flow restrictions 62 and 63 may be included in a valve construction for example of the type shown in Fig. 2 of Stein et al. Patent No. 2,285,540 and described therein.

If it be assumed that the pressure in bellows 67 decreases with decrease in pressure $P_1$ in output line 22, then the spring 68 will be effective to move the flow restriction 62 to increase the flow resistance between line 22 and line 61. The foregoing movement is against the bias of a spring 70 which biases the element 62 to open position and the element 63 to closed position. As element 62 is moved to close its restriction, the element 63 is moved to open its restriction. Thus, air pressure in line 61 will be reduced by outward flow of air from line 61 to atmosphere through the increased opening of restriction 63. This flow will continue until the pressure in line 61 will bear a relationship with respect to that in line 22 dependent upon the setting of flow restrictions 62 and 63. Since in the foregoing there was originally assumed a reduction in the pressure of line 22 which also produced a change in the restriction 62 additionally to reduce the pressure in line 61, it will be apparent that the reduction of pressure in line 61 will not be linearly related to the reduced pressure in line 22. As a matter of fact, the apparatus may be adjusted to approximate a square law relationship between $P_1$ and $P_2$. Thus, if the pressure $P_1$ in line 22 is reduced by one-half, the pressure $P_2$ in line 61 will be reduced to one-quarter of its previous value, i. e., it will be reduced by three-quarters of its original value.

In order to limit the travel of positioning stem 69 to a predetermined or selected range there is provided a pair of spaced adjustable stop members 71, 72 disposed at opposite sides of the pivoted lever 64. The latter is provided with an adjustable slide member 73 which coacts with spring 68 to establish the required pressure change in bellows 67 to effect the predetermined travel of stem 69. The spring 68 is shown in Fig. 1 as supported by a lever arm 74 and pivoted about a pivot point 75. The initial bias of spring 68 on lever 64 may be set by means of an adjustment screw 76 which rotates the spring-supporting lever 74 about pivot 75.

When the pressure in bellows 67 is sufficiently great to move lever 64 against stop 72 the pressure-modifying device 60 will be conditioned to transmit pressure from line 22 to line 61 with minimum reduction as a result of minimum throttling at the inlet port adjacent restriction 62 and minimum bleed to atmosphere through the exhaust port adjacent restriction 63. When the pressure in bellows 67 is at a value whereby the bias of spring 68 is great enough to move lever 64 against stop 71, the pressure-modifying device 60 will be conditioned to effect maximum reduction in the pressure transmitted to line 61 within the predetermined limits. Under this latter loading condition, increased loading pressure change in line 22 is required to produce a given pressure change in line 61 as compared with the former loading condition, thus increasing the effective proportional band of the steam pressure controller or regulator 21 at light loads, i. e., small pressures in line 22. Over the predetermined range of pressure in line 22 between the extreme values corresponding to the setting of the stops 71 and 72, the stem 69 of pressure-modifying device 60 is moved incrementally to effect gradual transition from minimum to maximum effective proportional band. In some applications it may be desirable to retard the change of pressure in bellows 67 and this may be accomplished through adjustment of flow restriction 66 in line 65.

In certain applications it may be preferable to obtain a maximum reduction of pressure transmitted to line 61 for high values of pressure in line 22 and minimum reduction in transmitted pressure to line 61 for low values of pressure in line 22. It will be apparent that the foregoing operation may be obtained by arranging bellows 67 with respect to positioning stem 69 such that their movements will be in opposition, such, for example, as by positioning bellows 67 to the opposite side of lever 64 from that shown in Fig. 1.

In Fig. 1-A there is shown a modification 60a of pressure-modifying device 60 wherein movement of the positioning stem 69a is controlled through the cooperation of cam 80 and follower 81, the cam surface of cam 80 being shaped to obtain various predetermined relations between the valve positions of stem 69a and the output pressure in line 22 of the automatic controller 21. The cam 80 is carried at the free end of pivoted lever 64a and is movable between adjustable stops 71a and 72a. Spring 68a applies a bias to lever 64a through an adjustable slide member 73a in a manner similar to the arrangement in Fig. 1, and spring 68a is supported by member 74a, the latter being adjustable as by means of screw 76a. It will be seen that the location of the rise on cam 80 will control the upward movement of stem 69a to move restriction 62 toward closed position and as the contour of the cam surface of cam 80 may be shaped in various predetermined manners, this modification will provide for greater flexibility than the pressure-modifying device 60 of Fig. 1.

Referring to Fig. 2 there is shown a modification of the control system of Fig. 1 with like parts being identified by the same reference characters. In this modification the pressure-modifying device 60 of Fig. 1 has been replaced by a pressure-modifying device 90 of different form. The device 90 includes a pair of flow-restricting elements 91 and 92. Flow-restricting element 91 comprises a capillary type throttling restriction such as a single capillary tube or a plurality of parallel capillary tubes, the latter type being illustrated. The flow-restricting element 92 comprises a turbulent flow type bleed restriction such as a single thin-plate orifice or nozzle. The effective size of the opening in element 92 may be varied as indicated by adjustable member 94 threadedly carried by the support 94a from element 92 to obtain a desired value of $P_2$ for a given pressure $P_1$. The flow restrictions 91 and 92 are connected in series through line 93, with line 22 feeding into restriction 91 and line 61 connecting with line 93 at a point between restrictions 91 and 92. With this arrangement there will be a reduction in the incremental change in the output presure $P_2$ in line 61 as the value of the pressure $P_1$ decreases.

The basis of the pressure ratio variation of $P_1$ with respect to $P_2$ is indicated by the following analysis, where $P_1$ = supply pressure to restriction 91 (gauge pressure related to atmosphere),
$P_2$ = supply pressure to restriction 92 (gauge pressure related to atmosphere),
$Q$ = rate of flow, and
$C$, $C'$ and $K$ are constants.

For capillary restriction 91 the following equation may be written:

$$P_1 - P_2 = C'Q \qquad (1)$$

and for orifice type restriction 92, $$P_2 = KQ^2 \qquad (2)$$

Accordingly, solving Equation 1 for $P_1$ it will be seen that, $$P_1 = P_2 + C'Q \qquad (3)$$

From Equation 2 it will be seen that, $$Q = \sqrt{P_2/K} \qquad (4)$$

and by substituting $\sqrt{P_2/K}$ for $Q$ in Equation 3 it will further be seen that $$P_1 = P_2 + C'\sqrt{P_2/K} \qquad (5)$$

or $$P_1 = P_2 + C\sqrt{P_2} \qquad (6)$$

Referring to Fig. 4, there has been shown by curve 97 a graphic illustration of Equation 6, $P_1 = P_2 + C\sqrt{P_2}$ with the supply pressure $P_1$ to restriction 91, an independent variable, forming the abscissa and supply pressure $P_2$ to restriction 92, a dependent variable, forming the ordinate.

It can be found from Equation 6 and readily may be seen from Fig. 4 that the ratio of $\Delta P_1/\Delta P_2$, for incremental changes, decreases as pressure $P_1$ increases. For example, in Fig. 4, for a given incremental change in $P_1$ of $\Delta P_{1m}$ there will be a corresponding incremental change in $P_2$ of $\Delta P_{2m}$. However, for a like incremental change in $P_1$ of $\Delta P_{1n}$ but at a greater value of pressure $P_1$ the corresponding incremental change in $P_2$ of $\Delta P_{2n}$ will be of greater value than the previous incremental change $\Delta P_{2m}$ at the smaller value of $P_1$. Thus, as the denominator $\Delta P_2$ of the ratio $\Delta P_1/\Delta P_2$ increases with increase in pressure $P_1$ and without an increase in the numerator $\Delta P_1$, then the value of the ratio $\Delta P_1/\Delta P_2$ must decrease as pressure $P_1$ increases.

For some applications it may be preferable to have the ratio $\Delta P_1/\Delta P_2$ increase as pressure $P_2$ increases. This form of reponse is obtained by interchanging the locations of restrictions 91 and 92 of Fig. 2 as shown in Fig. 2-A by pressure-modifying device 90a having restrictions 91a and 92a. Thus, by reversing the positions of the restrictions and having the orifice type throttling restriction 92a precede the capillary type bleed restriction 91a, the pressures $P_1$ and $P_2$ would be related in accordance with the equation $$P_1 = P_2 + CP_2^2 \qquad (7)$$

the latter relationship being graphically illustrated by the curve 98 in Fig. 5. Provision may be made for varying the effective size of the orifice in restriction 92a if desired.

While the pressure-modifying devices 60 and 90 of Figs. 1 and 2 have been shown as employed for varying the effective proportional band of a proportioning type pneumatic controller in relation to output air pressure, they may also be used in other applications to effect predetermined variation of any transmitted air pressure. Thus the supply pressure $P_1$ to restriction 62 (Fig. 1) or to restriction 91 (Fig. 2) may originate in any type of pressure transmitter such, for example, as a flow transmitter or temperature transmitter.

While the invention has been described thus far in connection with automatic control systems it is also applicable to measuring systems, particularly those systems including measuring means having a non-linear response and wherein it is desired to provide an output varying linearly with the magnitude of the quantity being measured. An arrangement of this type has particular utility where it is desired to utilize summation devices as it permits the summation of the outputs from a plurality of flow measuring devices or other similar devices having a non-linear response characteristic.

Referring to Fig. 3 there is shown a measuring system of the pneumatic feedback type employing a pressure-modifying means 100 for automatically modifying a pneumatic signal to be supplied to a utilization means for providing a response, for example, an indication at a scale 110, proportional to fluid flow in a pipe 111. The flow measuring device 112 is shown as a tilting manometer of the U-tube type having tap lines 113, 114 respectively connected to opposite sides of a flow restriction 115 in pipe 111. For the purpose of an example, pipe 111 may be considered as supplying combustion air to a boiler and the tilting manometer 112 will have a response proportional to the square of the flow of the combustion air. The frame 116 of the tilting manometer 112 is supported at 117 for pivotal movement about pivot 118. Chamber 119 over liquid column 120 is connected to tap line 113 and chamber 121 over liquid column 122 is connected to tap line 114 which, being downstreamward of tap 113, has the lower pressure and consequently the greater height and weight of liquid. Thus there will be produced a counterclockwise torque about the pivot 118 of the tilting manometer 112. This counterclockwise torque is applied through lever 124 to the valve stem 129 for adjusting the position of flow restrictions 126 and 127 of valve 125. A biasing spring 128 is provided to cause the stem 129 to follow the movement of lever 124. Air is supplied to valve 125 from any suitable source such as from inlet 130 by way of line 131. In order to provide an output pressure from valve 125 that will be proportional to the flow in pipe 111 rather than the square of the flow there is provided in the feedback portion of the measuring system a modulator or modifying device 100.

The modifying device 100 is similar to the device 90 of Fig. 2 and is shown as comprising two serially connected flow restrictions 101 and 102, flow connected as by pipe 103 in the pneumatic system. Flow restriction 101 is shown as a capillary type throttling restriction and restriction 102 is shown as a turbulent flow type bleed restriction, the latter having an orifice opening 102a exposed to a constant or fixed reference pressure such as atmosphere. Provision may be made for varying the effective size of the opening 102a in manner similar to that shown in Fig. 1 for element 92. Pneumatic signals from valve 125 are applied by way of a pipe 104 to restriction 101 and thus it will be seen that the pressure-modifying device 100 is flow connected in the pneumatic system between the signal producing source and a constant reference pressure. The modified signal is derived from the flow connection 103 between the two flow restrictions 101 and 102 and is applied by way of pipe 105 to a utilization means shown as a diaphragm 135 which acts through link 136 on the pivoted lever 116 in a counterbalancing or clockwise direction to oppose the above-mentioned counterclockwise torque due to the unbalance of the liquid columns 120 and 122 the magnitude of which depends on the air flow through pipe 111.

The valve 125 of Fig. 3 may be of the well known throttle and bleed type with comparatively limited air flow capacity such as shown in Fig. 2 of the Stein et al. Patent No. 2,285,540, and the modulator 100 includes a bleed type restriction requiring appreciable air flow. The air flow requirements of the modulator 100 may thus interfere with proper operation of the valve 125. Therefore, a pressure regulator 140 may be provided connected between modulator 100 and valve 125 by means of pipes 104 and 141. Regulator 140 includes a spring-loaded diaphragm 142, actuating a ball valve 143 to pass air from any suitable source such as from inlet 130. The air enters regulator 140 through pipe 144 to pipe 104 at a pressure proportionate to the air pressure in pipe 141. Any other type of regulator that will pass to pipe 104 air pressure proportionate to that in pipe 141 without requiring appreciable quantities of air from valve 125 may be employed instead of regulator 140, if desired.

With the foregoing arrangement the supply pressure $P_1$ to restriction 101 is related to the supply pressure $P_2$ to restriction 102 in accordance with the equation $$P_1 = P_2 + C\sqrt{P_2} \qquad (8)$$

which is the same as the aforementioned Equation 6. It will be seen that for high values of constant C, then $P_1$ will be substantially proportional to $\sqrt{P_2}$. Thus, $P_1$ will be substantially proportional to the flow in pipe 111, as $P_2$ varies as the square of the flow in pipe 111.

As the pressure $P_1$ in line 150 varies linearly with flow the movement of bellows 151 connected to line 150 will also have a linear relationship with respect to the flow in pipe 111. Accordingly, the indicator 152 actuated by bellows 151 and associated with linear scale 110 will provide an indication of the magnitude of the flow in pipe 111.

By converting the signal or response from devices such as manometers, normally having a response proportional to the square flow, to a linear response it is then possible to add these linear signals as by applying them to a summation device such, for example, as the type embodied in the averaging relay disclosed in U. S. Letters Patent No. 2,714,894 granted August 9, 1955 upon copending application Serial No. 294,700 of L. E. Jewett. Briefly, the device may comprise a lever arm pivoted intermediate its ends and having the two signals to be added applied at the opposite ends and to the opposite sides of the lever so cumulatively to produce a torque in the same direction about the pivot. This torque is opposed by a pressure derived from a constant supply and applied to the lever in a direction to counterbalance the above-mentioned torque. Thus there will be derived from the summation device a signal in accordance with the sum of the two linear signals applied to the device.

While preferred embodiments of the invention have been described and illustrated, it will be understood that further modifications thereof may be made without departing from the spirit and scope of the invention as set forth in the appended claims.

What is claimed is:

1. A pneumatic control system comprising a balanceable control means including a non-linear flow-measuring device, a pneumatic control signal-producing source, means for automatically variably modifying in a selected non-linear manner the pneumatic control signal supplied to said balanceable control means from said signal-producing source, said means comprising two serially-connected flow restrictions having dissimilar flow-pressure characteristics flow-connected in the pneumatic system between said control signal source and a constant reference pressure, said modified signal being derived from the flow connection between said two flow restrictions, and a feedback loop in said system extending between said balanceable control means and the first of said two serially-connected flow restrictions by way of said source and completed by the connection extending from between said two serially connected flow restrictions and said balanceable control means.

2. A balanceable pneumatic system comprising a non-linear flow-measuring device, means for automatically variably modifying in a selected non-linear manner a pneumatic signal supplied to said device from a signal-producing source, said means comprising two serially-connected flow restrictions having dissimilar flow-pressure characteristics flow-connected in the pneumatic system between the signal source and a constant reference pressure, the modified signal being derived from the flow connection between said two flow restrictions, and a feedback path in said system extending between said device and the first of said two serially-connected flow restrictions and completed by the connection extending between said two serially-connected flow restrictions and said device.

3. A system according to claim 2 wherein the pressure supplied to one of said flow restrictions bears a substantially square law relation with respect to the pressure supplied to the other of said flow restrictions.

4. A system according to claim 2 wherein said two serially-connected flow restrictions comprise a reducing valve connected in the pneumatic system, said reducing valve being operated by a bellows responding to the unmodified pneumatic signal.

5. A system according to claim 2 wherein one of said flow restrictions comprises a capillary section and the other of said flow restrictions comprises a turbulent flow type bleed restriction.

6. A system according to claim 2 wherein the order of connection of said two serially-connected flow restrictions is such that the pressure $P_1$ supplied to the first flow restriction and the pressure $P_2$ supplied to the second flow restriction are related in accordance with the equation $$P_1 = P_2 + C\sqrt{P_2}$$

where C is a constant.

7. A system according to claim 2 wherein the order of connection of said two serially-connected flow restrictions is such that the pressure $P_1$ supplied to the first flow restriction and the pressure $P_2$ supplied to the second flow restriction are related in accordance with the equation $$P_1 = P_2 + CP_2^2$$

where C is a constant.

8. A system according to claim 6 wherein the pressure $P_1$ is supplied to a capillary type restriction and pressure $P_2$ is supplied to an orifice type restriction.

9. A system according to claim 7 wherein the pressure $P_1$ is supplied to an orifice type restriction and the pressure $P_2$ is supplied to a capillary type restriction.

References Cited in the file of this patent

UNITED STATES PATENTS

| | | |
|---|---|---|
| 1,630,318 | Tate | May 31, 1927 |
| 1,897,857 | Otto | Feb. 14, 1933 |
| 1,920,827 | Wunsch | Aug. 1, 1933 |
| 1,959,889 | Wunsch | May 22, 1934 |
| 2,123,979 | Ward | July 19, 1938 |
| 2,166,077 | Spitzglass | July 11, 1939 |
| 2,412,739 | McCracken | Dec. 17, 1946 |
| 2,441,405 | Fitch | May 11, 1948 |
| 2,536,184 | Johnson | Jan. 2, 1951 |
| 2,589,251 | Heinz | Mar. 18, 1952 |

OTHER REFERENCES

Ziebolz: "Analysis and Design of Translator Chains," volume 1; "text," pages 228, 229 and 230 and volume two; "diagrams," Figures No. 337, 338 and 339, published 1946, by the Askania Regulator Company, Chicago, Illinois.